3,206,513
PROCESS FOR THE PREPARATION OF SALICYLALDEHYDE

Paul B. Budde, Midland, Mich., assignor to The Dow Chemical Company, Midland, Mich., a corporation of Delaware
No Drawing. Filed May 26, 1961, Ser. No. 112,769
13 Claims. (Cl. 260—600)

This invention relates to an improved process for preparing salicylaldehyde.

It is known that salicylaldehyde can be prepared by reacting phenol with sodium hydroxide and chloroform in an aqueous medium. However, it has now been found that when the above reaction is carried out in certain organic solvent mixtures appreciably higher yields of salicylaldehyde are obtained, and in addition, the amount of p-hydroxybenzaldehyde produced as an undesirable by-product is sharply reduced.

The organic solvent mixtures used in the process of the present invention comprise (1) an alkanol containing from 1 to 12 carbon atoms or an alkylamine containing from 2 to 8 carbon atoms and (2) an aromatic solvent having the formula:

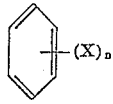

wherein each X represents the methyl or ethyl group or a halogen having an atomic number from 17 to 35, said halogens being chlorine or bromine, and $n$ is a number from 0 to 3.

In the improved process of the present invention, phenol and the aromatic solvent and alcohol or amine previously defined are mixed with sodium hydroxide in a suitable reaction vessel. Then the necessary amount of chloroform is added to the mixture and the temperature of the mixture maintained at from about 50° C. to about the reflux temperature of the mixture for a period of time sufficient to insure maximum possible conversion of the reactants. Generally from 1 to 3 hours will suffice, depending on the reaction temperature. The salicylaldehyde is then separated from the reaction mixture by conventional methods, such as by adding water to the reaction mixture and steam distilling to remove the organic solvents, and then acidifying and removing the salicylaldehyde by steam distillation. Any triphenoxymethane formed as a by-product is conveniently removed from the reaction vessel prior to the acidification and final distillation.

It is within the scope of the present invention to employ superatmospheric pressure although atmospheric pressure is most convenient and thus is preferred.

The reactants are combined preferably in the ratio of from about 2 to 3 moles of phenol and about 6 moles of sodium hydroxide per mole of chloroform. Although higher proportions of phenol and sodium hydroxide may be used, the yield of salicylaldehyde is not increased by varying the proportion of reactants beyond the preferred range.

The total volume of the solvent mixture used may vary over a broad range, depending upon the proportions of hydrocarbon and amine or alcohol comprising the solvent mixture. Preferably a total volume of 400–2000 ml. of solvent are used for each gram-mole of chloroform charge, with the hydrocarbon forming from 10–95 percent by volume of the solvent mixture. Generally, a comparatively small volume of solvent mixture per mole of chloroform will be sufficient when the solvent mixture contains relatively small amounts of hydrocarbon, and conversely, larger volumes of solvent will be required when the solvent mixture contains larger proportions of hydrocarbon.

The practice of the present invention is illustrated by a series of experiments in each of which 6.0 gram-moles of sodium hydroxide, 3.0 gram-moles of phenol and 1.0 gram-mole of chloroform were reacted in an organic solvent medium comprising an aromatic solvent and amine or alcohol of the respective genera previously disclosed. The phenol and aromatic solvent were mixed and added to the sodium hydroxide, the temperature during the addition gradually raising to 70–75° C. The reactant mixture was stirred for about 1 hour and the alcohol or amine was then added. The reaction mixture was heated to about 65° C. and the chloroform added over a period of 2.5 hours, the temperature of the reaction slurry being maintained at 70–75° C. After all of the chloroform was added the mixture was stirred for an additional hour. Then 1500 ml. of water were added to the mixture and the mixture steam distilled to remove the organic solvents. The material remaining in the reaction vessel was cooled in an ice bath and insoluble triphenoxymethane was removed by filtration. The filtrate was acidified to pH 2 with concentrated hydrochloric acid and steam distilled. The aqueous and organic layers of the distillate were then separated and analyzed for salicylaldehyde.

There are shown in Table I for each experiment the amine or alcohol and aromatic solvents used and their amounts and the yield of salicylaldehyde obtained, based on the chloroform charged.

Table 1

| Experiment No. | Hydrocarbon Solvent | | Amine or Alcohol | | Yield of Salicylaldehyde, percent |
|---|---|---|---|---|---|
| | Type | Amount, cc. | Type | Amount, cc. | |
| 1 | Benzene | 600 | Diethylamine | 100 | 48 |
| 2 | do | 600 | Ethanol | 100 | 46 |
| 3 | do | 600 | Isopropyl alcohol | 100 | 52 |
| 4 | do | 600 | t-Butyl alcohol | 100 | 53 |
| 5 | do | 350 | do | 350 | 52 |
| 6 | Chlorobenzene | 600 | do | 100 | 48 |
| 7 | Xylene | 600 | do | 100 | 51 |
| 8 | Benzene | 600 | 4-methyl-2-pentanol | 100 | 50 |
| 9 | do | 600 | n-Octanol | 100 | 47 |
| 10 | do | 600 | n-Decanol | 100 | 44 |

In a separate experiment carried out under similar conditions, wherein water was used as the solvent, a yield of only 38 percent salicylaldehyde was obtained.

In addition to diethylamine, other alkylamines within the genus hereinbefore described which may be used include dimethylamine, methyl ethyl amine, n-propylamine, di-n-propylamine, triethylamine, ethyl n-butyl amine and di-n-butylamine.

In addition to the solvents used in the preceding experiments, other solvents within the genus hereinbefore described which may be used include toluene, the isomeric xylenes and mixtures thereof, mesitylene, hemimellitene, pseudocumene and mixtures thereof, the isomeric triethylbenzenes, bromobenzene, o-dichlorobenzene, m-dichlorobenzene, p-dichlorobenzene and the corresponding dibromobenzenes, 1,3,5-trichlorobenzene and its isomers, and the corresponding tribromobenzenes.

I claim:

1. An improved process for preparing salicylaldehyde consisting essentially of (1) reacting by contacting sodium hydroxide, phenol and chloroform in a solvent mixture comprising (a) a non-aromatic solvent selected from the group consisting of an alkanol containing from 1 to 12 carbon atoms and an alkylamine containing from 2 to 8 carbon atoms and (b) an aromatic solvent having the formula:

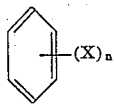

wherein each X is selected from the group consisting of methyl and ethyl groups and a halogen having an atomic number from 17 to 35 and $n$ is a number from 0 to 3, said reaction being carried out at a temperature of from about 50° C. to about the reflux temperature of the reaction mixture, and (2) separating the thus-formed salicylaldehyde from the reaction mixture.

2. A process as in claim 1 wherein the sodium hydroxide, phenol and chloroform are contacted in the proportions of 2 to 3 moles of phenol and about 6 moles of sodium hydroxide per mole of chloroform.

3. A process as in claim 1 wherein the aromatic solvent is benzene.

4. A process as in claim 1 wherein the aromatic solvent is chlorobenzene.

5. A process as in claim 1 wherein the aromatic solvent is xylene.

6. A process as in claim 1 wherein the non-aromatic solvent is diethylamine.

7. A process as in claim 1 wherein the non-aromatic solvent is ethanol.

8. A process as in claim 1 wherein the non-aromatic solvent is isopropyl alcohol.

9. A process as in claim 1 wherein the non-aromatic solvent is t-butyl alcohol.

10. A process as in claim 1 wherein the non-aromatic solvent is 4-methyl-2-pentanol.

11. A process as in claim 1 wherein the non-aromatic solvent is n-octanol.

12. A process as in claim 1 wherein the non-aromatic solvent is n-decanol.

13. An improved process for preparing salicylaldhyde consisting essentially of (1) reacting by contacting, at from about 50° C. to about the reflux temperature of the reaction mixture, from about 2 to 3 moles of phenol, about 6 moles of sodium hydroxide and about 1 mole of chloroform in a solvent mixture consisting essentially of (a) benzene and (b) an alkanol containing from 1 to 12 carbon atoms, and (2) separating the thus-formed salicylaldehyde from the reaction mixture.

References Cited by the Examiner

Ferguson: Chemical Reviews, vol. 38, pp. 229, 247 (1946).

Russell et al.: Organic Syntheses, vol. 22, (1942), pages 63 and 64.

Wynberg: Chemical Reviews, vol. 60 (1960), pages 169, 171, 183 and 184.

LEON ZITVER, *Primary Examiner.*

CHARLES B. PARKER, *Examiner.*

UNITED STATES PATENT OFFICE
CERTIFICATE OF CORRECTION

Patent No. 3,206,513                                              September 14, 1965

Paul B. Budde

It is hereby certified that error appears in the above numbered patent requiring correction and that the said Letters Patent should read as corrected below.

Column 3, line 22, for "comprising" read -- consisting essentially of --.

Signed and sealed this 24th day of May 1966.

(SEAL)
Attest:

ERNEST W. SWIDER
Attesting Officer

EDWARD J. BRENNER
                                                                                               Commissioner of Patents